June 16, 1936.     O. P. LAUFER     2,044,312
COMBINED ANIMAL RESTRAINING AND FEEDING DEVICE
Filed March 22, 1935     2 Sheets-Sheet 1
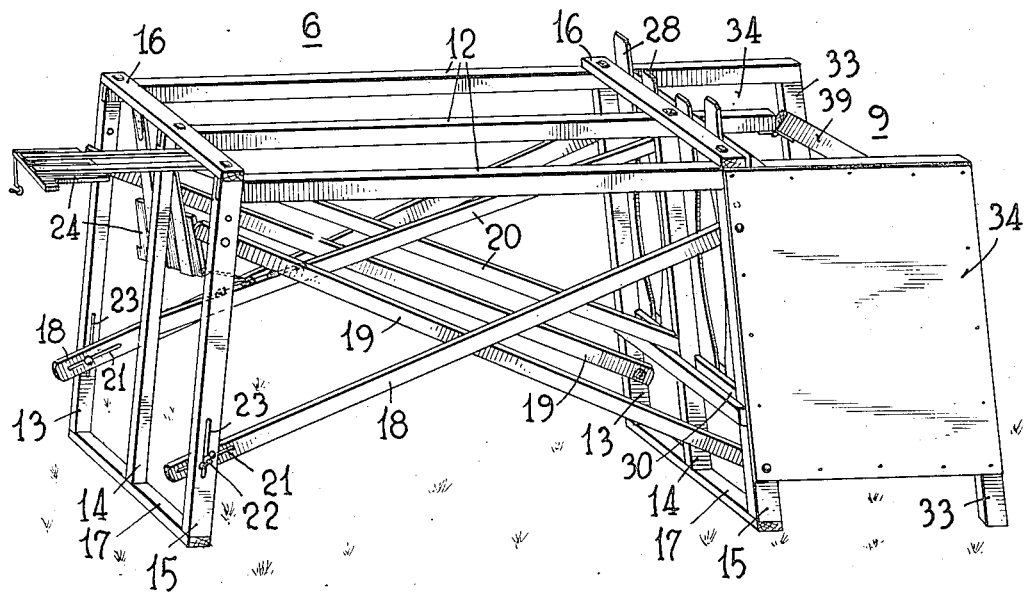
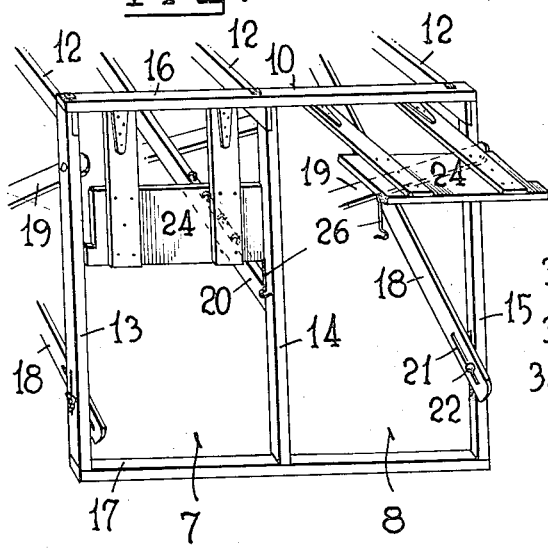
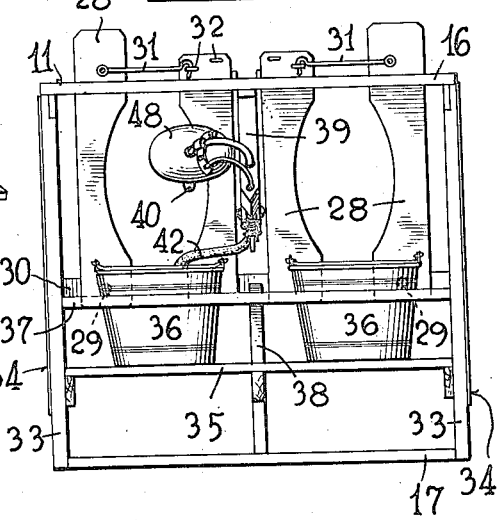
Inventor
Otto P. Laufer,
By Seymour & Bright
Attorneys June 16, 1936.   O. P. LAUFER   2,044,312
COMBINED ANIMAL RESTRAINING AND FEEDING DEVICE
Filed March 22, 1935   2 Sheets-Sheet 2
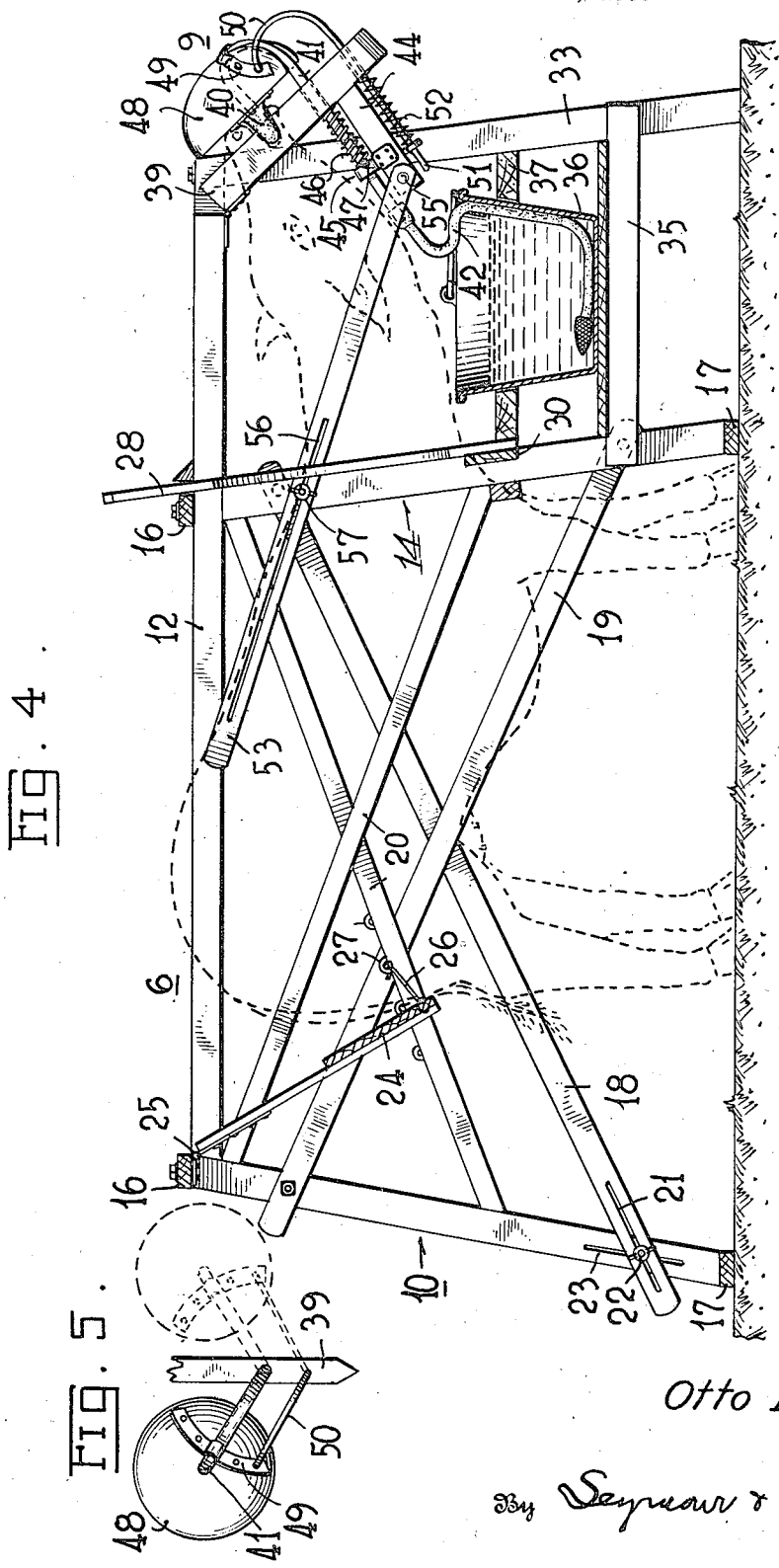
Inventor
Otto P. Laufer
By Seymour & Bright
Attorneys Patented June 16, 1936

2,044,312

UNITED STATES PATENT OFFICE 2,044,312

COMBINED ANIMAL RESTRAINING AND FEEDING DEVICE

Otto P. Laufer, Everett, Pa.

Application March 22, 1935, Serial No. 12,482

8 Claims. (Cl. 119—71)

This invention relates to improvements in combined animal restraining and feeding devices, and more particularly to an animal confining device having a stall communicating at one end with a compartment in which the feeding device is located.

This invention is particularly adapted for use in feeding young calves, and for teaching such animals to drink from a pail or bucket. Heretofore, it has been the practice in weaning a young calf away from its mother at feeding time, for the attendant to hold the calf with one hand and attempt with the other hand to force a rubber nipple into the mouth of the calf, said nipple being connected to a hose or the like leading into a pail or bucket of milk. With this method of feeding, it will be understood the work is very unpleasant and difficult, and oftentimes requires more than one attendant to bring about the desired result, due to the fact that young calves are easily frightened and are consequently hard to hold. Furthermore, it is well known that a calf, when first weaned away from its mother, will not, as a general rule, drink or eat from a pail resting on the ground at its feet, but on the contrary, will have a tendency to reach upwards. Consequently, in feeding, the attendant must at first hold the nipple above the calf's head and then gradually lower the nipple at each feeding time until the calf has become accustomed to this method of obtaining nourishment, after which the nipple may be discarded and the calf may be fed directly from a pail or the like. It will thus be seen that considerable time and effort are required to feed young calves until they have learned to take nourishment from a pail or the like.

It is therefore one of the objects of my invention to provide a device which will eliminate the disadvantages above noted, and enable the attendant to teach a young calf to drink or eat from a pail or the like without the necessity of holding the calf or giving it any assistance whatsoever. To accomplish this result, I provide an animal restraining device having one or more stalls in which the calf or calves may be effectively confined, said stalls communicating at their rear ends with a compartment in which I arrange my improved feeding device, whereby the calf in either stall may be readily fed from a nipple or the like.

A further object of the invention is to provide a restraining device of this character having adjustable means at the front and rear portions of each stall to prevent the animal from moving forwardly or rearwardly therein.

A still further object is to provide a combined restraining and feeding device of this character, in which the feeding means may be readily and adjustably connected to the front portion of the restraining device, intermediate two of the stalls.

Another object is to furnish a combined animal restraining and feeding device of this character which is inexpensive to manufacture, simple in construction, of relatively light weight, and easily transported from one place to another.

With the foregoing objects outlined and with other objects in view which will appear as the description proceeds, the invention consists in the novel features hereinafter described in detail, illustrated in the accompanying drawings, and more particularly pointed out in the appended claims.

In the drawings,—

Fig. 1 is a perspective view of my improved restraining and feeding device.

Fig. 2 is a similar view showing the rear portion only of the device.

Fig. 3 is a front elevation of the device.

Fig. 4 is a vertical longitudinal sectional view showing the device in use.

Fig. 5 is a front elevation of a detail.

Referring to the drawings in detail, 6 designates my improved animal restraining device, consisting of a plurality of stalls 7, 8 which communicate at one end with my improved feeding device 9 which is arranged in a compartment common to all of the stalls of the restraining device.

The restraining device preferably consists of a substantially rectangular framework including rear and front supporting frames 10 and 11 respectively, and horizontal longitudinal beams 12 connected to the upper ends of said supporting frames. Each of the frames 10 and 11 comprises upright supports 13, 14 and 15, and upper and lower cross pieces 16 and 17 respectively, said supports and cross pieces being spaced from each other a distance sufficient to permit a calf to pass between the same. The stalls 7 and 8 are formed with crossed side bars 18, 19 secured to the supports 13 and 15 respectively, and intermediate side members 20 secured at their ends to the intermediate support 14 of each supporting frame. As may be seen from Fig. 1, one end of each side bar 18 is provided with a slot 21 adapted to receive a bolt 22 which passes through a slot in each of the end uprights of the front supporting frame 10, as indicated at 23.

Each stall is provided with a gate 24 hingedly connected at 25 to the upper cross piece 16. This gate acts as a back stop to prevent the calf from moving backwards after it has once entered the stall, and for this purpose, I provide a hook 26 preferably secured to the lower inner edge of each gate, and adapted to engage any one of the eyelets 27 arranged on one of the members of the intermediate crossed bars 20. It will be appreciated that with this arrangement, calves of various sizes may be effectively confined within the stall in which an individual calf is placed, being prevented from moving sideways by the side bars 18, 19, 20, and the back stop 24 preventing its movement rearward. In order to prevent the calf from moving forwardly in the stall, I provide a pair of stanchions 28 for each stall, one member of each stanchion being pivotally connected at 29 to a cross bar 30 fixedly secured to the front supporting member 11. One member of each pair of stanchions is provided with a hook 31 adapted to engage either one of the eyelets 32 secured to the other one of the members of each pair.

As shown in Figs. 1 and 4, the horizontal beams 12 extend beyond the front supporting member 11, and at the extreme front end of the outer ones of said beams, I provide uprights 33, which cooperate with the uprights 13 and 15 respectively to support side walls 34. Said walls form the chamber or compartment in which the improved feeding device is arranged. A platform or shelf 35 is arranged within said chamber and secured to the uprights supporting the side walls. The platform is adapted to support a pail or bucket 36, and in order to prevent the latter from being tipped over by the calf, I provide a guard rail 37 extending across the front of the compartment and secured to the uprights 33. An auxiliary or second guard or dividing rail 38 may also be provided to maintain each pail in alignment with its respective stall. Of course, the cross bar 30 will prevent the pail from being moved rearwardly, and at this point it will be noted that the guard rail, dividing bar and cross bar are so disposed with respect to the platform that these various elements will surround the pail at a point adjacent its upper edge.

As shown in Figs. 1 and 4, the intermediate top beam 12 is provided at one end with a hinged arm 39 to which I attach the calf feeding device. This device consists of a nipple 40 connected to a hook-shaped pipe 41 that is swiveled in the arm 39, and is connected to a hose 42 leading from a pail 36 containing milk or the like. Another arm 44 is fixed to and projects inwardly from the arm 39, and it carries an eye 45. Between this eye and the arm 39, a coil spring 46 surrounds the pipe and bears against an abutment pin 47 on the pipe for normally yieldingly holding the nipple in a certain position relatively to the arm 39. When the calf pushes upwardly on the nipple, the pipe will slide in its supports 39 and 45, and when the pushing force is released, the spring 46 will again move the nipple downwardly. The nipple is preferably placed on the inner side of a guard 48 formed of rubber or the like, and this guard as well as the nipple may be swung into a position at the end of either one of the stalls, due to the fact that the pipe 46 can be swung about its axis extending through the parts 39 and 45. For the purpose of yieldingly holding the guard and nipple in position at one end of either one of the stalls, the guard is provided with an apertured plate or the like 49, the apertures of which cooperate with the curved end 50 of a retaining bar 51 which is also slidable in the arm 39 and is surrounded by a spring 52 that yieldingly urges the curved end of the bar toward the guard 48. Obviously, if the calf pushes upwardly on the guard, the spring 52 will permit the yielding bar 51 to yield.

In order that the nipple may be lowered from time to time to permit the calf to be trained to feed without holding its head upwardly, an adjusting bar 53 is connected to the arm 44, preferably by a pivotal connection 55. The bar 53 has a longitudinal slot 56 adjustably engaging a bolt 57 carried by the central one of the uprights of the supporting frame 11.

It will be understood from the above that the nipple is normally held in a position intermediate the stalls, and of course, said nipple may be shifted in front of one stall or the other whenever it is desired to use the device for feeding a calf or the like.

From the foregoing it is believed that the construction, operation and advantages of my invention may be readily understood by those skilled in the art, and I am aware that changes may be made in the details disclosed without departing from the spirit of the invention, as expressed in the claims.

What I claim and desire to secure by Letters Patent is:

1. An apparatus for use in training young animals to feed, comprising means for holding an animal in a confined position, a hingedly mounted arm, a pipe swiveled on the arm, a nipple and guard supported by the arm, yielding means for retaining the guard and nipple in certain positions relatively to the arm, a liquid container, and means for conveying liquid from the container to said pipe.

2. An apparatus for use in teaching young animals to feed, comprising a plurality of stalls arranged side by side, a nipple positioned at one end of the stalls and movable into a position at one end of either stall, supporting means for yieldingly holding the nipple in position at one end of either one of the stalls, a liquid container, and means for conveying the liquid from the container to said nipple.

3. An apparatus for use in teaching young animals to feed, comprising a plurality of stalls arranged side by side, a nipple positioned at one end of the stalls and movable into a position at one end of either stall, adjustable supporting means for yieldingly holding the nipple in position at one end of either one of the stalls, a liquid container, and means for conveying the liquid from the container to said nipple.

4. An apparatus for use in teaching young animals to feed, comprising a plurality of stalls arranged side by side, a nipple positioned at one end of the stalls and movable into a position at one end of either stall, vertically adjustable supporting means for yieldingly holding the nipple in position at one end of either one of the stalls, a liquid container, and means for conveying the liquid from the container to said nipple.

5. An apparatus for use in teaching young animals to feed, comprising a pair of stalls arranged side by side, a side wall secured to one end of each stall and forming a compartment common to both stalls, a nipple positioned in said compartment and movable into a position at one end of either stall, supporting means for normally holding the nipple in position intermediate said stalls, means for yieldingly holding the nipple in position at one end of either one of the stalls, a liquid container, and means for conveying the liquid from the container to said nipple.

6. An apparatus for use in teaching young animals to feed, comprising a pair of stalls arranged side by side, a side wall secured to one end of each stall and forming a compartment common to both stalls, an arm hingedly connected to said stalls and arranged intermediate thereof, a nipple supported by said arm, means for yieldingly holding the nipple in position at one side or the other of said arm, a liquid container, means for conveying the liquid from the container to said nipple, and means for raising or lowering said arm.

7. An apparatus for use in teaching young animals to feed, comprising a framework, a partition dividing said framework into a plurality of stalls, a side wall secured to one end of each stall and forming a compartment common to all of said stalls, an arm hingedly connected to said partition and arranged within said compartment, a nipple supported by said arm, means for yieldingly holding said nipple at one side or the other of said arm, a liquid container, means for conveying the liquid from the container to said nipple, and adjustable means secured to said partition and said arm for holding the latter in position.

8. An apparatus for use in teaching young animals to feed, comprising a framework, a partition dividing said framework into a plurality of stalls, a back stop hingedly connected to the framework at one end of each stall, a stanchion secured to the framework at the other end of each stall, an arm hingedly connected to the framework intermediate said stanchions, a nipple supported by said arm, yielding means for retaining the nipple in certain positions relatively to the arm, a liquid container, and means for conveying liquid from the container to said nipple.

OTTO P. LAUFER.